Nov. 2, 1954  W. C. N. HOPKINS  2,693,589
HEATED SIDE VIEW MIRROR WITH CLEARANCE AND INDICATING LIGHT
Filed April 22, 1952
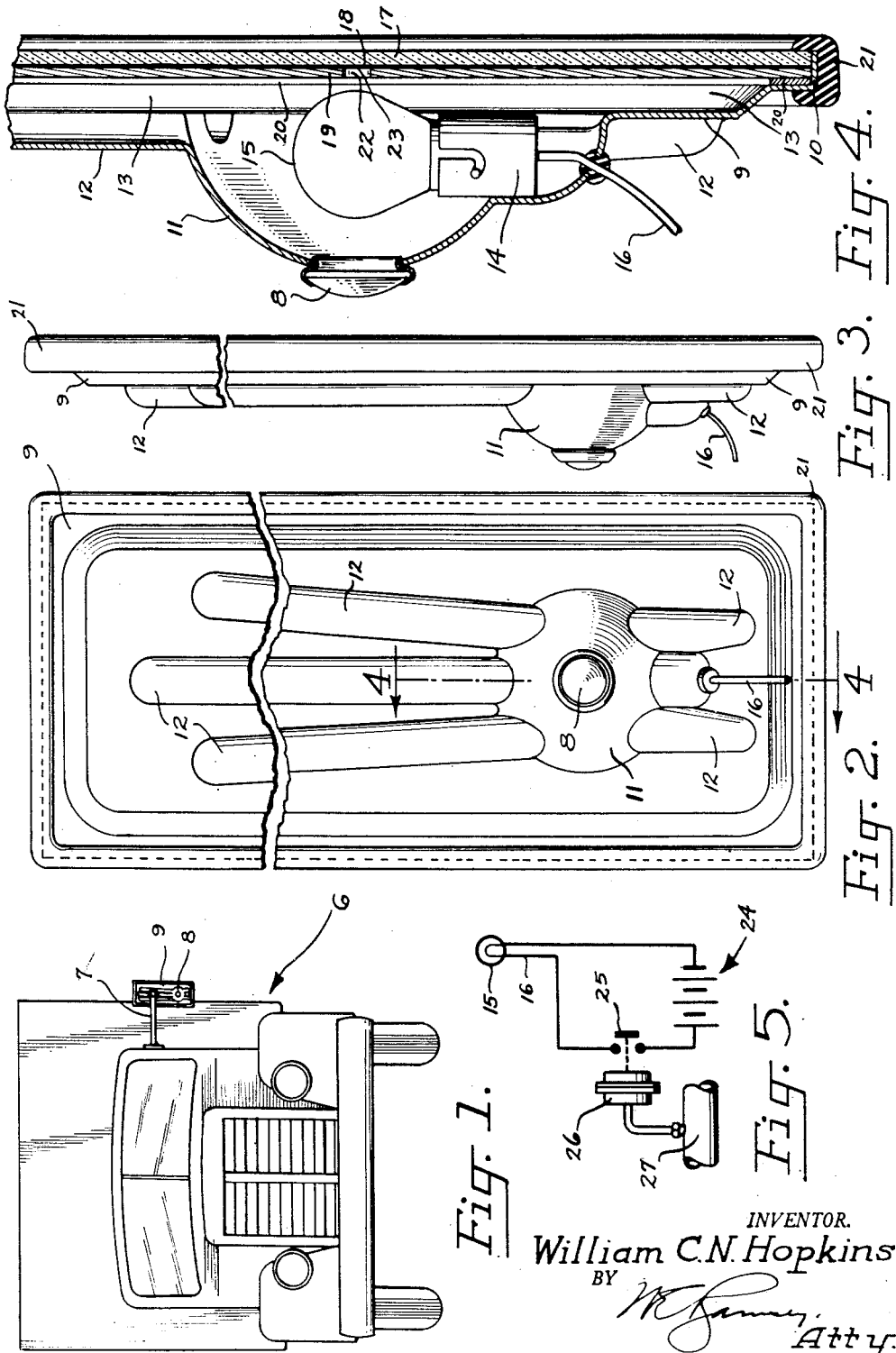
INVENTOR.
William C.N. Hopkins
BY
Atty.

United States Patent Office 2,693,589
Patented Nov. 2, 1954

2,693,589

HEATED SIDE VIEW MIRROR WITH CLEARANCE AND INDICATING LIGHT

William C. N. Hopkins, Portland, Oreg.

Application April 22, 1952, Serial No. 283,670

1 Claim. (Cl. 340—98)

My invention relates to a side view mirror and clearance light for a vehicle and, more particularly, to a mirror of this type in which special provision is made to heat the mirrored surface so as to inhibit the formation and accumulation of frost, ice, and condensation moisture thereon.

One object of my invention is to provide a hollow framed side view mirror which is warmed by a light bulb carried within the hollow frame and which further is provided with a small translucent window through the mirrored surface in order that the driver of the vehicle may have a tell tale signal as to the operativeness of the light bulb.

The mirror of the instant invention is of particular utility when employed as a side rear view mirror on large trucks and buses. Conventionally, such a mirror is mounted upon a long arm which protrudes laterally out from the cab of the vehicle in order that the driver may see around the vehicle body and observe traffic conditions to his rear. Such protuberant external mounting presents two problems to the effective functioning of the mirror, it being a particular object of my invention to solve both of these problems with an efficient, yet simple structure.

The first problem presented is that the lateral protrusion of the mirror beyond the truck or bus body makes necessary, by the laws of some states, and makes convenient, in any instance, the incorporation of a clearance light in the back of the mirror so that oncoming vehicles will be warned of the approximate maximum width of the body. The most apparent solution to this problem, of course, is to mount a clearance light within the hollow frame of the mirror per se. At the same time, however, it must be remembered that the driver of a large truck or bus should direct most of his attention to the condition of the road and other driving factors and a minimum of his attention to such distracting operations as turning on clearance lights or determining the operativeness thereof. Accordingly, I prefer to connect the electric light which is carried by the frame of the side view mirror with a pressure or temperature actuated switch, the switch in turn being operatively connected to the engine manifold, block, exhaust pipe, or air brake line in order that the clearance light will burn continuously whenever the engine is running. Such an automatic actuation of the light frees the mind of the driver for attention to the more important tasks of operating the vehicle.

Since the driver of the vehicle cannot observe, from the cab of the vehicle, when the clearance light has burned out or become inoperative, I provide an additional indicating structure in the mirror. Thus, a further object of my invention is to provide a small window through the face of the mirror proper and in registration with the light bulb so the driver of the vehicle may observe the operating condition of the latter at a glance and without leaving the driver's compartment.

The second problem which is born of the external mounting of a side view mirror is clouding the face of the mirror itself. Thus, during periods of cold or wet weather, ice and frost often accumulate and moisture often condenses on the face of an exposed side view mirror. This is a particularly acute problem on transcontinental or long haul trucks and buses which must meet a schedule and, thus, must operate in all types of weather. With the instant invention, however, I inhibit the formation of view obstructing agencies by warming the mirror with the heat which is radiated from the light bulb of the positioning light. To this end, the mirror frame member is formed with a raised dome having a plurality of raised fingers radiating longitudinally therefrom, the latter serving to bound warm air circulation ducts across the back of the mirror proper. The light bulb, in turn, is housed within the raised dome and, additionally, a coextensive sheet of heat conductive metal abuts the back face of the mirror. As air within the dome is warmed by the continuously burning light bulb, the warm air ducts circulate the air across the face of the heat conductive metal sheet so the mirror itself is warmed uniformly across its face and the accumulation of frost and ice and the condensation of moisture is inhibited. In this manner, continuous trouble free operation of the mirror is assured in all types of weather.

Other objects and advantages of my invention will be set forth in the following detailed description, taken in conjunction with the accompanying drawings, wherein:

Fig. 1 is a front view of a large truck having the side view mirror of the instant invention installed thereon;

Fig. 2 is a shortened view of the back of the mirror showing the raised dome which houses the light bulb and indicating the plurality of raised fingers which radiate out from this raised dome to bound warm air circulation ducts;

Fig. 3 is a shortened side view better indicating the manner in which the frame itself, the raised dome, and the raised fingers all are spaced laterally away from the mirror proper to accommodate the circulation of warm air across the back face of the mirror;

Fig. 4 is a detail view, taken substantially on the line 4—4, Fig. 2, showing the sheet of heat conductive metal which abuts the back face of the mirror and indicating both the aperture through this sheet and the translucent window which is formed in the mirror proper to radiate a small indicating light through the face of the mirror;

Fig. 5 is a schematic diagram of the electric circuit for the light bulb, this diagram indicating the pressure actuated switch which is joined in series with the light bulb and which is actuated in response to the reduced air pressure of the vehicle engine during operation.

In Fig. 1 of the drawings I have shown a truck 6 having an elongated arm 7 which protrudes from one side of the cab to support the side view mirror of the instant invention. From this drawing, it will be evident that the position of the mirror defines the lateral margin of the truck body. Accordingly, it is advisable, and some state laws require, that the mirror be provided with a clearance light. The numeral 8 identifies such a light in the drawing and the structure thereof, in combination with the other parts of the mirror, forms the substance of my invention.

In detail, the side view mirror includes an elongated rectangular frame member 9 having a flange 10 (see Fig. 4) which extends about the marginal periphery thereof. Adjacent one end of the frame member 9, a raised dome portion 11 protrudes above and is formed in the frame member. In function, this dome defines an encompassing shield for a light bulb as hereinafter will be explained.

Turning to Figs. 2 and 3, it will be seen that a plurality of raised fingers 12 radiate longitudinally out from the raised dome 11. These fingers extend substantially the entire length of the frame member 9 across the back of the mirror in order to bound and to define warm air circulation ducts. Further, as shown in Fig. 4, the central portion of the frame member 9 is spaced laterally from the remainder of the mirror structure in order to provide a warm air space 13 substantially coextensive with the mirror proper. Thus, the air space 13, the raised fingers 12, and the raised dome 11, all are joined in an integral encompassing air space across the back of the mirror, the combined function thereof being to warm the mirror proper.

Within the raised dome 11, I prefer to mount a socket 14 which is adapted to carry an electric light bulb 15, the socket being provided with an electric wire 16 for lighting the bulb in well known manner. Additionally, the dome itself is pierced by an aperture in which is mounted a translucent colored glass or the like to define the previously mentioned clearance light 8. As shown, this clearance light is aligned laterally with the light bulb so that approaching vehicles may observe the approximate bounding margin of the truck 6, this margin being defined by the light 8.

Turning now to Fig. 4, I have indicated the glass portion of the side view mirror at 17 and the silver or other opaque surfacing thereon at 18. Further, immediately behind the surfacing or backing layer 18, I provide a heat conductive metal sheet 19. Preferably, this sheet is aluminum or the like. To complete the assembly, a cork gasket 20 and an encompassing elastic border or retention member 21 are provided. As shown, the mirror proper, the metal sheet 19, and the cork gasket 20 are all carried within the flange 10 of the frame member and the rubber border or retention member 21 seals these parts against the entrance of moisture and holds them together. The cork gasket lies between the metal sheet 19 and the frame member 9. This insulates the metal sheet from the atmosphere and inhibits heat loss from the sheet 19 to the external member 9.

Referring particularly to the heat conductive metal sheet 19, it will be seen that a small aperture 22 is formed therethrough. This aperture is aligned with the light bulb 15 and with a translucent window 23 which is formed in the backing layer 18 of the mirror. When the mirror proper first is fabricated, the window 23 most easily is formed by placing a small dot of nail polish or the like on the back of the glass. Thereafter, the silver backing 18 will not adhere to the nail polish and the small window 23 will be left for observation purposes. Accordingly, when the light bulb 15 is operative, the driver of the truck can confirm this fact by glancing at the window 23. A small amount of light will be visible therethrough but, as will be appreciated, the window should be small enough that the light will not distract the attention of the driver.

In accord with another important feature of my invention, the heat conductive metal sheet 19 serves yet another function. Thus, this sheet abuts the back face of the mirror and is substantially coextensive therewith across the surfacing 18 in a one sheet mirror and across the second glass sheet where such is provided. Accordingly, when the electric light bulb 15 is burning, the air within the dome 11, the raised fingers 12, and the air space 13 is warmed, the amount of heat being dependent upon the type and wattage of the bulb employed. This warm air is circulated across the back face of the heat conductive sheet 19 and, in accord with the conductivity of the latter, the back face of the mirror 17, 18 itself is warmed. Thus, the formation of frost and ice upon the face of the mirror glass 17 is inhibited and the condensation of moisture upon the mirror and frame also is inhibited. In cold weather and, more particularly, on long hauls, this function is of real importance to the driver of a truck or bus.

To provide for the automatic operation of the electric light bulb 15, a pressure responsive switch is placed in series therewith. In Fig. 5, the light bulb is indicated diagrammatically at 15 and the electric wire at 16. Additionally, a battery is shown at 24, a switch bar at 25, a pressure responsive diaphragm member at 26, and a manifold or other reduced air pressure portion of the vehicle engine at 27. As will be understood by those skilled in the art, operation of the internal combustion engine of the truck 6 creates an area of reduced air pressure within the manifold 27. This reduced air pressure acts upon the diaphragm member 26 to close the switch bar 25 and join the light bulb 15 to the battery 24. Optionally the switch 25 may be actuated in response to the pressure in an air brake line, the operation of the fuel pump, the temperature of the engine block, the pressure in the exhaust pipe, the turning on of the ignition switch, or any similar condition indicative of the engine operation. Accordingly, whenever the engine operates, the light bulb 15 will be actuated. This automatic actuation of the light bulb frees the mind of the driver for attention to the more important details of driving and assures the actuation of the position indicating light 8 whenever the vehicle is operated. In combination therewith, it is important that the previously explained aperture 22 and window 23 be provided so that the driver of the truck will be informed if the electric mechanism fails or the light bulb burns out. In this connection, it will be apparent that the driver cannot see the clearance light 8 from the cab of the truck and, were it not for the aperture 22 and the window 23, he would be required to get out of the cab and walk around to the front of the truck in order to observe whether the light actually was burning.

In summation, it will be seen that I have provided a side view mirror and clearance light for a vehicle in which provision is made for inhibiting accumulation of frost, ice, and moisture upon the mirror itself. At the same time, the mirror provides both a clearance light for the vehicle and a condition indicating means so the driver may observe whether the light and heat elements of the mirror are functioning properly.

I claim:

A side view mirror and clearance light for a vehicle, comprising an elongated rectangular frame member having a flange extending about the periphery thereof and having a raised dome defining a shield for a light bulb, a plurality of raised fingers radiating longitudinally out from said raised dome to define air ducts, a mirror carried within the flange of said frame member and having a coextensive sheet of heat conductive metal abutting the back face thereof, said sheet of metal being spaced laterally away from the inner surface of said frame member mutually to bound an air space across the back face of the sheet, and an electric light bulb mounted within said raised dome for warming the air within said dome, air space, and air ducts, the warmth from such air being transmitted to the mirror by said heat conductive sheet.

References Cited in the file of this patent

UNITED STATES PATENTS

| Number | Name | Date |
| --- | --- | --- |
| 1,231,561 | Briggs | July 3, 1917 |
| 1,415,465 | Nigh | May 9, 1922 |
| 1,874,027 | Condon | Aug. 30, 1932 |
| 2,010,138 | Condon | Aug. 6, 1935 |
| 2,149,598 | Girl et al. | Mar. 7, 1939 |
| 2,514,647 | Jolbiffe | July 11, 1950 |
| 2,588,825 | Goodman et al. | Mar. 11, 1952 |
| 2,595,331 | Calihan et al. | May 6, 1952 |